US011988472B2

(12) United States Patent
Sasaki

(10) Patent No.: US 11,988,472 B2
(45) Date of Patent: May 21, 2024

(54) CLEANING BALL AND METHOD FOR MANUFACTURING SAME

(71) Applicant: MIZUKI CO., LTD., Ibaraki (JP)

(72) Inventor: Takuya Sasaki, Ibaraki (JP)

(73) Assignee: MIZUKI CO., LTD., Ibaraki (JP)

( * ) Notice: Subject to any disclaimer, the term of this patent is extended or adjusted under 35 U.S.C. 154(b) by 408 days.

(21) Appl. No.: 17/613,923

(22) PCT Filed: Dec. 21, 2020

(86) PCT No.: PCT/JP2020/047598
§ 371 (c)(1),
(2) Date: Nov. 23, 2021

(87) PCT Pub. No.: WO2021/157226
PCT Pub. Date: Aug. 12, 2021

(65) Prior Publication Data

US 2022/0260328 A1 Aug. 18, 2022

(30) Foreign Application Priority Data

Feb. 7, 2020 (JP) ................................ 2020-019651

(51) Int. Cl.

| | |
|---|---|
| ***F28G 1/12*** | (2006.01) |
| ***B08B 1/10*** | (2024.01) |
| ***B08B 9/04*** | (2006.01) |
| ***B08B 9/053*** | (2006.01) |
| ***B08B 9/055*** | (2006.01) |
| ***B08B 9/057*** | (2006.01) |

(52) U.S. Cl.
CPC .................. *F28G 1/12* (2013.01); *B08B 1/10* (2024.01); *B08B 9/04* (2013.01); *B08B 9/0552* (2013.01); *B08B 9/057* (2013.01); *B08B 9/053* (2013.01)

(58) Field of Classification Search
CPC .. B08B 1/10; B08B 9/04; B08B 9/053; B08B 9/055; B08B 9/0552; B08B 9/057; F28G 1/12; B24B 31/14
See application file for complete search history.

(56) References Cited

FOREIGN PATENT DOCUMENTS

| | | | | |
|---|---|---|---|---|
| CN | 109513700 A | * | 3/2019 | ........... B08B 9/0552 |
| JP | S4530242 Y | | 11/1970 | |
| JP | S5726396 A | | 2/1982 | |
| JP | S5930000 A | | 2/1984 | |
| JP | S6081493 U | | 6/1985 | |
| JP | H05280889 A | | 10/1993 | |

* cited by examiner

*Primary Examiner* — Randall E Chin
(74) *Attorney, Agent, or Firm* — HAUPTMAN HAM, LLP

(57) ABSTRACT

A cleaning ball with a naturally derived material bonded to a surface of the cleaning ball for a condenser in a power plant is capable of performing efficient cleaning, and even if the material bonded to the surface of the ball is discharged to the ocean, the material does not cause damages to a marine environment. The cleaning ball includes a sponge rubber ball configured to deform and clean a heat transfer tube of the condenser; and a skin layer including crushed sand bonded to a surface of the sponge rubber ball. The crushed sand comprises sandstone containing granite particles, and the crushed sand has a particle size between 0.05 mm and 2.00 mm, and the skin layer is formed in concave and convex shapes on a non-deformed shape of the sponge rubber ball, and is configured to deform corresponding to deformation of the sponge rubber ball.

4 Claims, 5 Drawing Sheets

CLEANING BALL AND METHOD FOR MANUFACTURING SAME

CROSS-REFERENCE TO RELATED APPLICATIONS

The present application is a National Phase of International Application No. PCT/JP2020/047598 filed Dec. 21, 2020, which claims the benefit of priority from the prior Japanese patent application No. 2020-019651 filed on Feb. 7, 2020, the entire contents of which are incorporated herein by reference.

TECHNICAL FIELD

The embodiment relates to a cleaning body of a sponge ball made of rubber (hereinafter referred to as a "cleaning ball") used for a sponge cleaning ball equipment (hereinafter referred to as a "cleaning ball equipment") that automatically cleans a heat transfer tube of a condenser in a thermal power plant or a nuclear power plant, for example.

BACKGROUND ART

A thermal power plant typically uses seawater or river water as cooling water that flows through heat transfer tubes in a condenser in order to condense steam into condensed water of high-purity by heat exchange, after the steam is used to drive a stream turbine. When the condenser's heat transfer characteristics deteriorate, the degree of vacuum in the condenser decreases, causing a great deterioration in a turbine performance. Accordingly, the heat transfer tubes in the condenser need to always be kept at a high degree of cleanliness.

It has been widely known that a large part of the deterioration in performance of the condenser is due to a substance that increases the heat transfer resistance, which adheres to an inner surface of the heat transfer tubes. As a means for maintaining the inner surface of the heat transfer tubes at a high degree of cleanliness, cleaning ball equipment that automatically cleans the heat transfer tube has been provided for practical use.

The cleaning ball equipment uses a cleaning ball that has a diameter slightly larger than the inner diameter of the heat transfer tube and is easily deformed in the heat transfer tube filled with cooling water (seawater). The cleaning ball flows through the heat transfer tube, together with the cooling water, while the surface of the ball is compressed. The cleaning ball is pressed against an inner wall of the heat transfer tube to clean the same, thereby obtaining a high degree of cleanliness.

Therefore, the cleaning ball equipment requires a cleaning ball that meets a high standard of an operational condition, and the selection of the cleaning ball must consider both heat transfer and anticorrosion properties of the heat transfer tube. In particular, optimum operational condition in a seamless brass tube for a condenser (hereinafter referred to as a "brass tube") requires performing the cleaning while keeping the protective coating necessary for maintaining the corrosion resistance in the inner wall of the heat transfer tube, and to prevent an excess of adhering substance that disrupts heat transfer of the tube.

The brass tube generally relies on a coating resistant to corrosion caused by seawater. The coating is formed on its inner surface of the brass tube, by iron ion implantation. While the brass tube exhibits stable corrosion resistance provided by iron hydroxide formed by iron ion implantation adhering to the inner surface of the tube, fouling on the inner surface of the tube is facilitated by the coating, causing deterioration in heat transfer performance. Accordingly, a cleaning ball equipment is required as an appropriate management measure for the coating.

When introduction of chlorine into cooling water is avoided from the viewpoint of environmental conservation, an increase of slime mold and adhesion of marine organisms such as barnacles on the inner surface of the heat transfer tube happens, causing deterioration in heat transfer performance. Accordingly, cleaning ball equipment is effective as a means for preventing such failures.

Further, if the brass tube is replaced by a titanium tube in order to improve the corrosion resistance of the heat transfer tube of the condenser, there is a disadvantage that the fouling by marine organisms happens more easily on the titanium tube than on the brass tube. In order to solve the problem, a cleaning ball having an outer sheath bonded to a surface of the ball has been put into practical use, where the outer sheath is prepared by crushing synthetic resin into fine chips and bonding the same on to the surface of the ball, so as to enhance wear resistance and a scale-scraping effect of the cleaning ball as a cleaning body. (see FIG. 1B).

As an example of the cleaning ball, Patent Literature 1 discloses a cleaning ball obtained by bonding a particulate abrasive made of rubber or the like, bonded to an outer surface of a sphere, having a particle size sufficient to make the outer surface uneven. Patent Literature 2 discloses a cleaning ball to which a particulate abrasive such as a short piece of synthetic resin particles or synthetic resin single filaments is bonded to an outer surface of a ball. The cleaning ball has the effect of being able to eliminate slime or the like adhering to an inner surface of a tube without scraping off the protective coating formed on the inner surface of the tube in the heat exchanger and being able to improve the heat exchange efficiency and lengthen the life of the equipment by performing efficient cleaning.

CITATION LIST

Patent Literature

Patent Literature 1: Japanese Patent Application No. H05-280889

Patent Literature 2: Japanese Patent Application No. S57-26396

SUMMARY OF INVENTION

Technical Problem

However, when a cleaning ball in each of Patent Literatures 1 and 2 is put into practical use in the cleaning ball equipment, the cleaning ball, together with cooling water, flows through the heat transfer tube to remove scale on the inner wall of the heat transfer tube. Accordingly, members of the outer sheath of the cleaning ball (i.e., synthetic resin crushed into fine chips) flows out while wearing off and is discharged out of the system (or into the ocean). As a result, a small amount of crushed pieces of synthetic resin are discharged into the ocean over a long time period. Accordingly, the practical use of such a cleaning ball has been discouraged because of current strict marine environmental conservation policy. Accordingly, a cleaning ball capable of performing efficient cleaning and having a low impact on the marine environment has been desired.

The embodiment is directed to providing a cleaning ball capable of performing efficient cleaning of a condenser in a power plant and a method for manufacturing the same. According to the embodiment, even if a material bonded to the surface of the ball is discharged to the ocean, the discharged material does not pollute the marine environment and has a low impact on the same.

Solution to Problem

A cleaning ball according to one aspect of the embodiment includes a sponge rubber ball configured to deform and clean a heat transfer tube of a condenser, and a skin layer including crushed sand bonded to a surface of the sponge rubber sphere, in which the crushed sand includes sandstone containing granite particles, and the crushed sand has a particle size between 0.05 mm and 2.00 mm, and the skin layer is formed in a concave and convex shape on a non-deformed shape of the sponge rubber ball, and is configured to deform corresponding to deformation of the sponge rubber ball.

A method for manufacturing a cleaning ball according to one aspect of the embodiment includes steps of preparing a sponge rubber ball for cleaning a heat transfer tube of a condenser, pre-processing a surface of the sponge rubber ball, coating the pre-processed sponge rubber ball with an adhesive, making crushed sand being made of sandstone containing granite particles and having a particle size between 0.2 mm and 2.0 mm, adhering the crushed sand to the sponge rubber ball coated with the adhesive, and drying the adhesive on the surface of the sponge rubber ball with the adhered crushed sand.

Another method for manufacturing a cleaning ball according to one aspect of the embodiment includes the steps of preparing a sponge rubber ball for cleaning a heat transfer tube of a condenser, pre-processing a surface of the sponge rubber ball, mixing an adhesive and crushed sand having a particle size between 0.05 mm and 0.80 mm to produce a mixture, coating the pre-processed sponge rubber ball with the mixture, and drying the sponge rubber ball coated with the mixture.

In the method for manufacturing the cleaning ball, a mass ratio of the crushed sand to the adhesive in the mixture is 10:90 to 50:50.

Advantageous Effect of Invention

According to the embodiment, a cleaning ball for a condenser in a power plant capable of performing efficient cleaning can be efficiently manufactured. The cleaning ball does not pollute the marine environment and thus causes a low impact on the same, even if a material bonded to a surface of the ball is discharged to the ocean.

BRIEF DESCRIPTION OF DRAWINGS

FIG. 3 is an enlarged sectional view of a surface portion of the cleaning ball according to the embodiment, where

DESCRIPTION OF EMBODIMENT

Figure 1A:
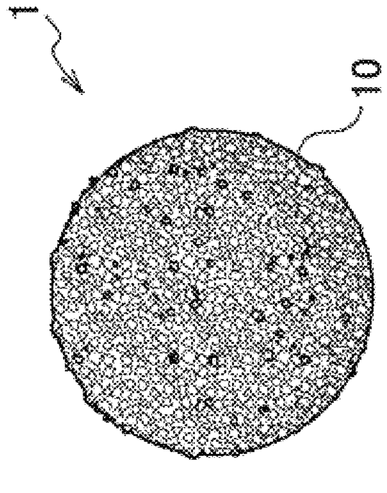
FIG. 1A is a schematic view illustrating a cleaning ball according to an embodiment.

An embodiment will be described below with reference to the drawings. In the following drawings, common portions are respectively assigned the same reference numerals, and overlapping description is omitted for the portions respectively assigned the same reference numerals.

[Configuration of Cleaning Ball 1]

Figure 1B:
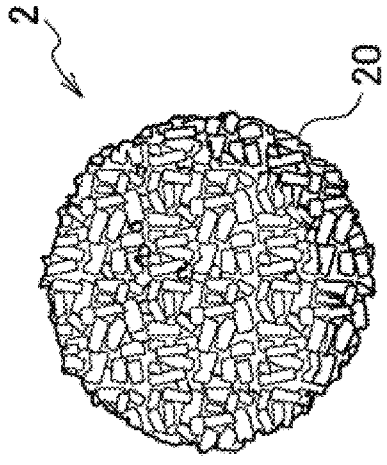
FIG. 1B is a schematic view illustrating a cleaning ball in a comparative example.
Figure 1C:
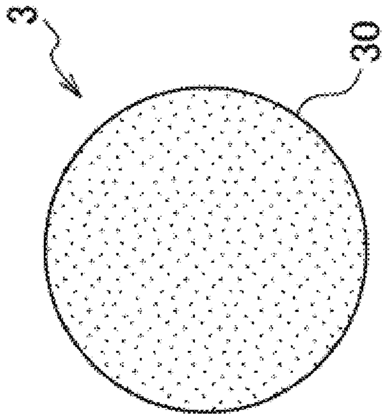
FIG. 1C is a schematic view illustrating a sponge ball in a comparative example coated with nothing.

A configuration of a cleaning ball 1 according to an embodiment will be described with reference to FIGS. 1 to 3. FIG. 1A is a schematic view of the cleaning ball according to the embodiment, FIG. 1B is a schematic view of a cleaning ball in a comparative example, and FIG. 1C is a schematic view of a sponge ball without coating. FIGS. 2A to 2C are cross-sectional views of FIGS. 1A to 1C, respectively. FIGS. 3A and 3B are enlarged sectional views of a surface portion of the cleaning ball, where FIG. 3A is a schematic view in which concave and convex shapes are evident, and FIG. 3B is a schematic view in which concave and convex shapes are less evident. The cleaning ball 1 for cleaning a heat transfer tube of a condenser according to the embodiment includes a sponge rubber sphere 30 and a skin layer containing crushed sand 10. The skin layer is bonded to a surface of the sponge rubber sphere 30 with an adhesive 11. The cleaning ball 1 according to the embodiment is hereinafter referred to as a "crushed sand coating ball 1".

Figure 2A:
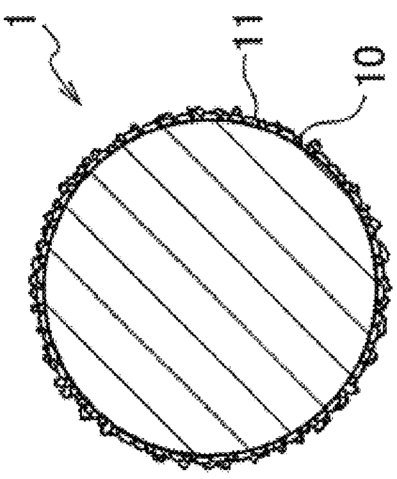
FIGS. 2A to 2C are cross-sectional views of the cleaning balls illustrated in FIGS. 1A and 1B and the sponge ball illustrated in FIG. 1C, respectively.
Figure 2B:
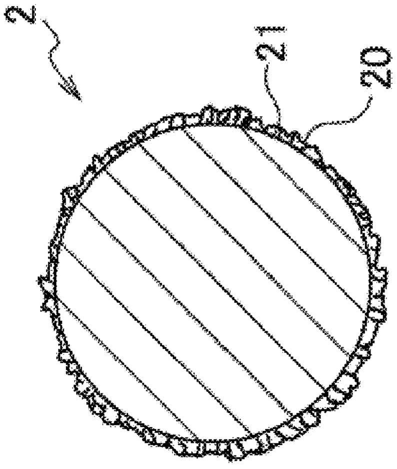
Figure 2C:
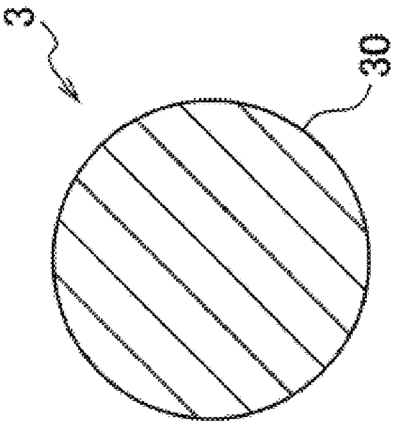
Figure 3A:
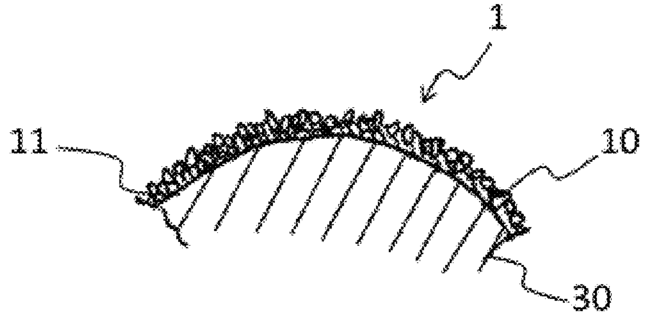
FIG. 3A is a schematic view in which a concave and convex shape is evident.
Figure 3B:
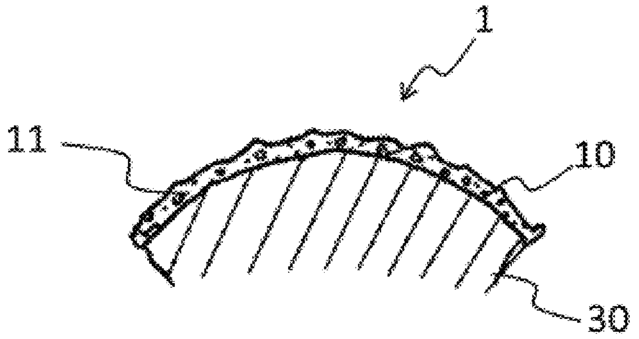
FIG. 3B is a schematic view in which a concave and convex shape is less evident.

The sponge rubber sphere 30 illustrated in FIGS. 2A to 2C is manufactured to match the inner diameter of the heat transfer tube to be cleaned, and the diameter thereof is approximately 10 to 50 mm. Natural rubber or a mixture of natural rubber and synthetic rubber can be used for the sponge rubber sphere 30. As to natural rubber, a natural rubber material that is susceptible to microbial decomposition and having a photodegradable property is preferably used. When synthetic rubber is mixed with natural rubber, a mass ratio of synthetic rubber to natural rubber is preferably 50:50 to 95:5. Examples of synthetic rubber to be used may include SBR (styrene-butadiene rubber), EPDM (ethylene-propylene-diene), SBS (styrene-butadiene rubber), and TPO (thermoplastic polyolefin). Further, the sponge rubber sphere 30 may be manufactured by using natural rubber or a mixture with a composition containing a biodegradable material having a higher biodegradation speed than that of natural rubber. As a result, even if the crushed sand coating ball 1 is discharged into the ocean or the like, the high biodegradability of the sponge rubber sphere 30 helps to reduce the negative effect on the marine environment.

A cleaning ball (sponge ball) 3 illustrated in FIG. 1C is composed of the sponge rubber sphere 30 that does not have any skin layer or coating on its surface, and has been conventionally used. Because the cleaning ball 3 is made of a sponge rubber material alone, the cleaning ball has disadvantages of wearing severely and taking time to remove slime due to the inefficient removal of slime in the heat transfer tube of the condenser. A cleaning ball 2 in the comparative example illustrated in FIG. 1B is a cleaning ball obtained by bringing synthetic resin into crushed pieces 20 of fine chips and bonding the crushed pieces 20 to a surface of the ball to form an outer sheath, as described above. The use of the cleaning ball 2 in the comparative example improves the efficiency in removing the slime in the heat transfer tube of the condenser and also makes it possible to remove hard slime, in particular. However, if the crushed pieces 20 of chips including synthetic resin are discharged into the ocean, such pieces of synthetic resin are likely to cause damages to the marine environment, as described above. On the other hand, the crushed sand coating ball 1 in the embodiment illustrated in FIG. 1A is a novel cleaning ball having unprecedented advantages of having high removal efficiency of slime in the heat transfer tube of the condenser. At the same time, the crushed sand coating ball 1 does not pollute the marine environment and has a low impact on the same, even if the crushed sand 10 bonded to the surface of the ball is discharged into the ocean.

Generally, crushed sand is sand obtained by artificially crushing a natural rock into smaller pieces using a crusher, a pulverizer, or the like. The crushed sand 10 may be any crushed sand if it contains relatively hard rock particles. In the present embodiment, river sand that is made of sandstone containing many granite particles is used as the crushed sand 10. When the crushed sand 10 contains hard rock particles such as granite particles, the removal efficiency of the slime in the heat transfer tube of the condenser is also the same as that of synthetic resin. As to the crushed sand 10 in the present embodiment, crushed sand excluding impurities and having a particle size between 0.05 mm and 2.00 mm is used. In a particle size classification of soil based on the International Society of Soil Science (ISSS), sand having a particle size between 0.2 mm and 2.00 mm is coarse sand, and sand having a particle size between 0.02 mm and 0.2 mm is fine sand. In the present embodiment, the crushed sand coating ball 1 using the crushed sand 10 (coarse sand) having a particle size between 0.2 mm and 2.0 mm and the crushed sand coating ball 1 using the crushed sand 10 (a mixture of coarse sand and fine sand) having a particle size between 0.05 mm and 0.80 mm are described. Even if either one of the crushed sands 10 is used, the crushed sand coating ball 1 has a skin layer of the crushed sand coating ball 1, where the skin layer is bonded to the surface of the ball with the adhesive 11, is formed into a pluralities of concave and convex shapes and has deformability. The skin layer is configured to deform together with the sponge rubber sphere 30. The particle size of the crushed sand 10 affects removal of slime. Accordingly, the crushed sand 10 having a size adapted to a material and a dimension of the heat transfer tube is used.

In the environment in which a material for the heat transfer tube in a power plant is titanium material or the like, and seawater is used as a fluid in the tube, the inner surface of the tube is easily fouled by adhesion of marine organisms. The crushed sand coating ball 1 using crushed sand 10 (coarse sand) having a particle size between 0.2 mm and 2.0 mm to form evident concave and convex shapes in the skin layer, as illustrated in the schematic view of FIG. 3A, is effective for cleaning. The crushed sand coating ball 1 is manufactured by using a direct coating method, described below. If the particle size of the crushed sand 10 exceeds 2.0 mm, the crushed sand coating ball 1 does not smoothly flow in the heat transfer tube, because the crushed sand 10 overly protrudes from the surface of the crushed sand coating ball 1, creating large frictional resistance with the inner wall of the tube. Moreover, the crushed sand 1 falls off from the surface of the cleaning ball, because it is difficult to hold the crushed sand 10 with an adhesive.

On the other hand, when a material for a heat transfer tube in a power plant is brass material or the like, and seawater is used as a fluid in the tube, dirt readily accumulates on the inner surface of the tube, requiring more frequent ball cleanings. In such environment, a crushed sand coating ball 1 manufactured using crushed sand 10 (a mixture of coarse sand and fine sand) having a particle size between 0.05 mm and 0.80 mm in a mixture ratio of the crushed sand 10 (less than 50%) and an adhesive 11 (50% or more) using a mixed coating method, described below, is used. A skin layer of the crushed sand coating ball 1 is formed to have less evident concave and convex shapes than that in FIG. 3A, as illustrated in the schematic view of FIG. 3B. Such a form improves wear resistance of the crushed sand coating ball 1, and is effective for anticorrosion of the heat transfer tube such as a brass tube.

As the adhesive 11, a rubber-based adhesive being high in affinity with the sponge rubber sphere 30 and the crushed sand 10 and capable of exhibiting deformability in a finished state is used. For example, a chloroprene rubber-based solvent solution-type adhesive is used. As illustrated in the cross-sectional view of FIG. 2A, the thickness of the skin layer composed of the adhesive 11 and the crushed sand 10 in the crushed sand coating ball 1 has a maximum thickness of approximately 2.00 mm. Because the thickness of the skin layer is relatively thinner than that of the diameter (10 to 50 mm) of the sponge rubber sphere 30, which is also deformable, the deformability of the crushed sand coating ball 1 is kept, and the crushed sand coating ball 1 can pass through the heat transfer tube smoothly.

Although the skin layer composed of the adhesive 11 and the crushed sand 10 has a form of coating the entire surface of the sphere in FIG. 1A, the embodiment is not limited to this, but the form may be a form of coating the sphere in a ring shape or a form of coating the sphere in a cross ring shape.

[Method for Manufacturing Crushed Sand Coating Ball 1 (Cleaning Ball)]

Figure 4:
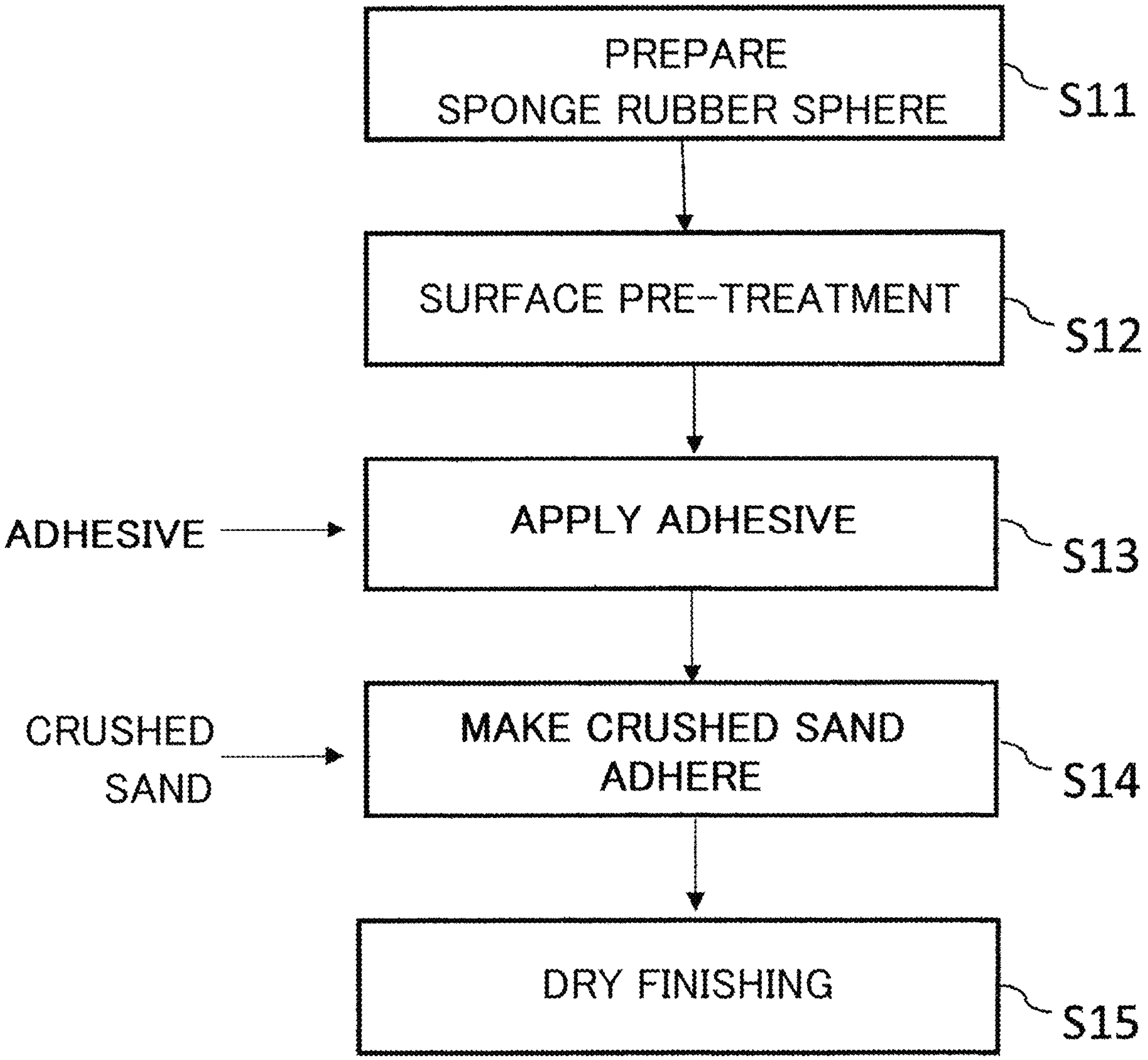
FIG. 4 is a flowchart illustrating a method for manufacturing the cleaning ball (a direct coating method) according to the embodiment.
Figure 5:
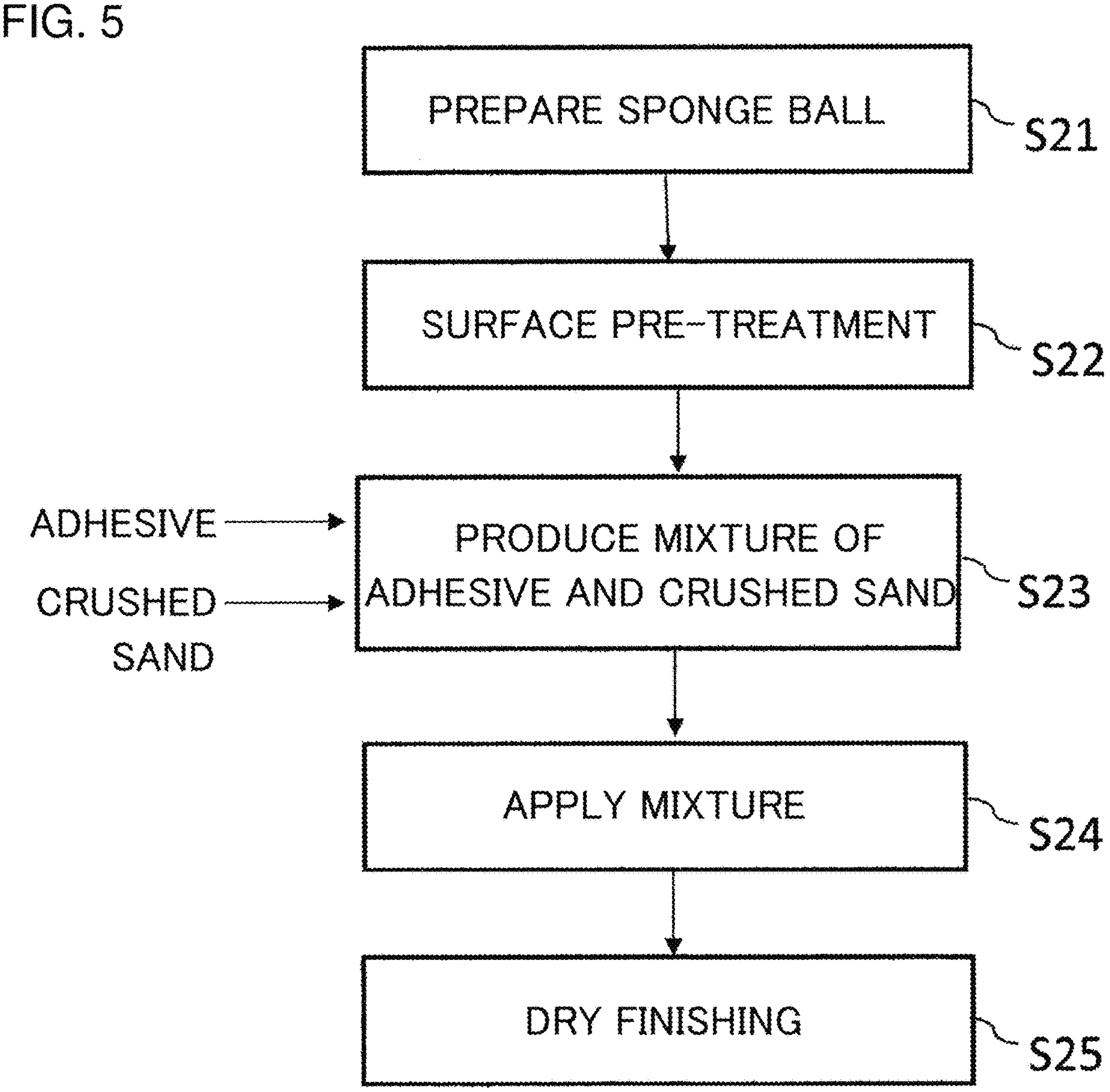
FIG. 5 is a flowchart illustrating a method for manufacturing the cleaning ball (a mixed coating method) according to the embodiment.

Next, a method for manufacturing the crushed sand coating ball 1 will be described with reference to FIGS. 4 and 5. The method for manufacturing the crushed sand coating ball 1 includes a direct coating method and a mixed coating method. FIG. 4 is an explanatory view illustrating a flow of the direct coating method, and FIG. 5 is an explanatory view illustrating a flow of the mixed coating method.

The direct coating method is mainly used when manufacturing a crushed sand coating ball 1 covered with relatively large crushed sand 10 (coarse sand) having a particle size between 0.2 mm and 2.0 mm, and the mixed coating method is mainly used when manufacturing a crushed sand coating ball 1 covered with crushed sand 10 (a mixture of coarse sand and fine sand) having a particle size between 0.05 mm and 0.80 mm. As described above, the crushed sand coating ball 1 covered with the crushed sand 10 having a particle size between 0.2 mm and 2.0 mm is used in a power plant or the like using a titanium material or the like as a material for heat transfer tubes, and the crushed sand coating ball 1 covered with the crushed sand 10 having a particle size between 0.05 mm and 0.80 mm is used in a power plant or the like using brass material or the like as a material for heat transfer tubes. First, the direct coating method will be described with reference to FIG. 4.

(Direct Coating Method)

[Step S11; Preparation Process]

First, a sponge rubber sphere 30 manufactured to match the inner diameter of a heat transfer tube to be cleaned is prepared. As described above, as the sponge rubber sphere 30, natural rubber or a mixture of natural rubber and synthetic rubber may be prepared. However, from the viewpoint of environmental conservation, natural rubber or a mixture of natural rubber and synthetic rubber having a composition for manufacturing rubber blended with a biodegradable material added thereto is preferably prepared.

[Step S12: Surface Treatment Process]

Next, to enhance the bonding property of the crushed sand 10 to the sponge rubber sphere 30, fine dust or dirt that has adhered to the surface of the sponge rubber sphere 30 is removed, and a protrusion or the like of sponge rubber is cut off to smooth the surface if any. A soft cloth product or the like is used to remove fine dust or dirt so as not to damage the surface of the sponge rubber sphere 30. Treatments to the surface of the sponge rubber sphere 30 help the adhesive 11 to be applied uniformly.

[Step S13: Process for Applying Adhesive 11]

Next, the adhesive 11 is applied to the surface of the sponge rubber sphere 30. In the present embodiment, the adhesive 11 is applied to the entire surface of the sphere, as illustrated in FIG. 1A. When the adhesive 11 is applied to the sponge rubber sphere 30 by piercing a long sewing needle or a metal skewer into the sponge rubber sphere 30, for example, the adhesive 11 can be uniformly and efficiently applied to the entire surface of the sphere. If an amount of the adhesive 11 to be applied is too large, the crushed sand 10 is fully buried within the adhesive when the crushed sand 10 is adhered to the surface of the sphere. Accordingly, the adhesive 11 needs to be applied thin (in a thickness of approximately 1 mm).

As described above, a rubber-based adhesive, e.g., a chloroprene rubber-based solvent liquid-type adhesive that has high affinity with the sponge rubber sphere 30 and the crushed sand 10 and has deformability in a finished state is used as the adhesive 11. Although the adhesive 11 is applied to the entire surface of the sphere in the present embodiment, the adhesive 11 may not be applied to the entire surface but applied in a ring shape or a cross ring shape.

[Step S14: Process for Adhering Crushed Sand 10]

In this process, the crushed sand 10 to be used is first prepared. Although the crushed sand 10 may be any crushed sand, crushed sand 10 being river sand that is made of sandstone containing many granite particles and having a particle size between 0.05 mm and 2.00 mm, and preferably a particle size between 0.2 mm and 2.0 mm without impurities is prepared in the present embodiment. Although a method for making the prepared crushed sand 10 adhere to the sponge rubber sphere 30 may be any method, the crushed sand 10 can also be adhered to the sponge rubber sphere 30 by uniformly laying the crushed sand 10 on a relatively large tray or the like and rolling the sponge rubber sphere 30 coated with the adhesive 11 on the crushed sand 10. The crushed sand 10 can also be adhered to the sponge rubber sphere 30 coated with the adhesive 11 by spraying the crushed sand 10 onto the sponge rubber sphere 30.

At this time, as illustrated in the schematic view of FIG. 3A, the crushed sand 10 is adhered to the sponge rubber sphere 30 uniformly and evenly, such that the skin layer of the crushed sand coating ball 1 exhibits evident concave and convex shapes formed of the crushed sand 10. If the excess crushed sand 10 is adhered only to a part of the sphere, such excess crushed sand 10 is easily falls off while passing through the heat transfer tube. The crushed sand 10 is adhered to the sponge rubber sphere 30 such that the maximum thickness of the skin layer of the crushed sand coating ball 1 is approximately 2.00 mm. If the thickness of the skin layer is larger than 2.00 mm, the crushed sand 10 falls off easily, and the deformability of the crushed sand coating ball 1 is difficult to maintain.

[Step S15: Dry Finishing Process]

After the crushed sand 10 adhered to the sponge rubber sphere 30, the adhesive 11 is dried until it sets. The drying is preferably performed by a hot air dryer or the like capable of adjusting temperature and time. In drying, the adhesive 11 is dried in a drying chamber partitioned by a shield plate, breathability of which is maintained, such that dust or the like does not adhere to the sponge rubber sphere 30. When the adhesive 11 is set fully, the crushed sand coating ball 1 is completed. By the above-described processes for the direct coating method, the crushed sand 10 is bonded to the surface of the sponge rubber sphere 30, and the crushed sand coating ball 1 having deformability can be efficiently manufactured.

In the crushed sand coating ball 1 manufactured using the direct coating method, the particle size of the crushed sand 10 is larger than the coating thickness of the adhesive 11. Accordingly, when the crushed sand coating ball 1 cleans the inner surface of the heat transfer tube by sliding inside the tube, the crushed sand 10 is damaged, dropped, and consumed. As a result, crushed sand coating balls 1 lose cleaning capability, however, most of all crushed sand coating balls 1 are recovered by a ball recovery unit in the cleaning ball equipment. The recovered crushed sand coating ball 1 has a shape similar to that of the original sponge rubber sphere 30. Accordingly, a recycled product can be produced using a recoating method by performing washing and external form polishing finish. Therefore, the crushed sand coating ball 1 is a product that may contribute to a reduction in environmental loads without being disposed of as a waste.

(Mixed Coating Method)

Next, a mixed coating method will be described with reference to FIG. 5. A preparation process in step S21 and a surface treatment process in step S22 are the same as the processes in steps S11 and S12, respectively, in the above-described direct coating method, and hence description thereof is omitted, and step S23 and subsequent steps will be described.

[Step S23: Process for Producing Mixture of Adhesive 11 and Crushed Sand 10]

In this process, the adhesive 11 and the crushed sand 10 are first prepared. As described above, as the adhesive 11, a chloroprene rubber-based solvent liquid-type adhesive or the like is prepared. The crushed sand 10 may be any crushed sand. In the present embodiment, crushed sand 10 that is river sand made of sandstone containing many granite particles having a particle size between 0.05 mm and 2.00 mm and preferably a relatively small particle size between 0.05 mm and 0.80 mm without impurities is prepared. A mass ratio of the prepared adhesive 11 and crushed sand 10 in the mixture is preferably 10:90 to 50:50. The use of the crushed sand coating ball 1 manufactured in this mixture ratio is effective for anticorrosion of a heat transfer tube made of brass or the like, and the wear resistance of the crushed sand coating ball 1 may also be improved.

The larger the mass ratio of the adhesive 11 becomes, the more firmly the crushed sand 10 is bonded to the sponge rubber sphere 30, and the more the wear resistance of the crushed sand coating ball 1 is improved. The adhesive 11 and the crushed sand 10 are mixed with each other such that the crushed sand 10 is evenly mixed with the adhesive 11.

[Step S24: Process for Applying Mixture]

Although a method for making the mixture prepared in step S23 adhere to the sponge rubber sphere 30 may be any method, the mixture can be applied by evenly laying the mixture on a relatively large tray or the like and rolling the sponge rubber sphere 30 on the mixture, like in the above-described direct coating method, for example. The mixture can also be evenly applied to the sponge rubber sphere 30 using a brush or the like. The mixture can be efficiently applied to the sponge rubber sphere 30 when the application is performed by piercing a long sewing needle, a metal skewer, or the like into the sponge rubber sphere 30.

The mixture is uniformly and evenly applied to the sponge rubber sphere 30 such that the skin layer of the crushed sand coating ball 1 has less evident concave and convex shapes formed of the crushed sand 10, as illustrated in a schematic view of FIG. 3B, unlike in the direct coating method.

A dry finishing process in step S25 is the same as the process in step S15 in the direct coating method, and hence description thereof is omitted. By the above-described processes in the mixed coating method, the crushed sand 10 is bonded to the surface of the sponge rubber sphere 30, and the crushed sand coating ball 1 having deformability can be efficiently manufactured.

Although a case where the above-described processes in the direct coating method and mixed coating method are manually performed as above, each of the processes or all the processes can also be automatically performed using a machine. When the above-described processes are automatically performed using a machine, a large amount of crushed sand coating balls 1 can be manufactured, and the respective qualities thereof are stabilized. Further, when there has been a defect in the crushed sand coating ball 1 manufactured using a machine, the defect is manually corrected so that the productivity and completeness can be enhanced.

The crushed sand coating ball according to the embodiment is configured by bonding the crushed sand to the surface of the sponge rubber sphere, as described above. Accordingly, the heat transfer tube of the condenser in the power plant can be efficiently cleaned. The crushed sand coating ball has an advantage of not causing an environmental pollution. Even if the crushed sand bonded to the sponge rubber sphere falls off and is discharged to the ocean, it has a low impact on the marine environment.

The crushed sand coating ball according to the above-described embodiment is an example, and its configuration can be appropriately changed without departing from the spirit and scope of the invention.

REFERENCE SIGNS LIST

1 cleaning ball (crushed sand coating ball), 2 cleaning ball in comparative example, 3 sponge ball, 10 crushed sand, 11, 21 adhesive, 20 chip-shaped crushed piece of synthetic resin, 21 adhesive, 30 sponge rubber sphere

The invention claimed is:

1. A cleaning ball comprising:
a sponge rubber ball configured to clean a heat transfer tube of a condenser; and
a skin layer composed crushed sand bonded to a surface of the sponge rubber ball with an adhesive, wherein
the crushed sand comprises sandstone containing granite particles, and the crushed sand has a particle size between 0.05 mm and 2.00 mm, and
the skin layer is formed in a plurality of concave and convex shapes, on the sponge rubber ball, and is configured to deform corresponding to deformation of the sponge rubber ball.

2. A method for manufacturing a cleaning ball, comprising steps of:
preparing a sponge rubber ball configured to clean a heat transfer tube of a condenser;
pre-processing a surface of the sponge rubber ball;
coating the pre-processed sponge rubber ball with an adhesive;
adhering crushed sand comprising sandstone containing granite particles having a particle size between 0.2 mm and 2.0 mm, to the surface of the sponge rubber ball coated with the adhesive; and
drying the adhesive on the surface of the sponge rubber ball with the adhered crushed sand.

3. A method for manufacturing a cleaning ball, comprising steps of:
preparing a sponge rubber ball configured to clean a heat transfer tube of a condenser;
pre-processing a surface of the sponge rubber ball;
mixing an adhesive with crushed sand having a particle size between 0.05 mm and 0.80 mm to produce a mixture;
coating the pre-processed sponge rubber ball with the mixture; and
drying the sponge rubber ball coated with the mixture.

4. The method for manufacturing the cleaning ball according to claim 3, wherein a mass ratio of the crushed sand to the adhesive in the mixture is 10:90 to 50:50.

* * * * *